US006546979B2

(12) United States Patent
Jonkka

(10) Patent No.: US 6,546,979 B2
(45) Date of Patent: Apr. 15, 2003

(54) METHOD FOR CONTROLLING A DRUM DEBARKER

(75) Inventor: Arvo Jonkka, Pori (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/092,899

(22) Filed: Mar. 8, 2002

(65) Prior Publication Data

US 2002/0139443 A1 Oct. 3, 2002

(30) Foreign Application Priority Data

Mar. 30, 2001 (FI) ............................................ 20010664

(51) Int. Cl.[7] ............................ B27L 1/04; B23Q 15/00

(52) U.S. Cl. .................... 144/341; 144/208.9; 144/356; 144/402; 144/403

(58) Field of Search ........................... 144/208.1, 208.9, 144/340, 341, 356, 357, 382, 384, 403, 402

(56) References Cited

U.S. PATENT DOCUMENTS 5,247,978 A * 9/1993 Silenius et al. ............. 144/341
5,660,076 A 8/1997 Jonkka et al.

FOREIGN PATENT DOCUMENTS

| | | |
|---|---|---|
| FI | 991530 | 1/2001 |
| WO | WO91/17039 | 11/1991 |
| WO | WO94/05474 | 3/1994 |

* cited by examiner

*Primary Examiner*—W. Donald Bray
(74) *Attorney, Agent, or Firm*—Burns, Doane, Swecker, & Mathis, L.L.P.

(57) ABSTRACT

The present invention relates to a method controlling a drum debarker by way of using the drum weighing information in the control of the drum debarking process. The method comprises the steps of determining the weight of the contents in the drum
determining the filling degree of the debarking drum
determining the average density of the log bunch tumbling in the debarking drum from drum weighing information and drum filling degree information, and
determining a target value for the log retention time or debarking work in the debarking drum.

Based on the information thus obtained, at least one following variables is controlled: the drum rotating speed, discharge rate of logs from the drum and infeed rate of logs into the drum so as to achieve the desired target value for the log retention time or debarking work in the debarking drum.

20 Claims, 4 Drawing Sheets

METHOD FOR CONTROLLING A DRUM DEBARKER

The present invention relates to a method for controlling the operation of a drum debarker on the basis of drum weighing information.

The control of the filling degree of a drum debarker has traditionally for decades been based on visual monitoring through the outlet of the drum. At late 1980's, attempts were made to utilize the log weighing information in controlling the filling degree of the debarking drum. However, it has been difficult to implement a reliable weighing system, since among other complications, the weight of log material in the drum does not necessarily always correlate with the percentage of the drum filling degree. This is because the greenness degree of wood and variations in the moisture content thereof affect the weighing result. Furthermore, variations in the log length and diameter cause changes in the average density of the log bunch in the drum and, hence, affect the weighing result.

An important factor in the function of a drum debarker is the debarking retention time. A longer retention is needed when logs of inferior debarking qualities must be handled. These kinds of factors deteriorating the debarking efficiency are, e.g., drying or freezing of logs. The retention time varies according to the actual wood content of the drum, i.e. the average density of the log bunch, and the drum filling degree. Herein, the term drum filling degree is defined as the ratio of the cross-sectional segment occupied by the log bunch in the overall cross-sectional area of the drum periphery to half the cross-sectional area of the drum periphery, whereby the ratio is conventionally expressed as a percentage. The required retention time is shorter for a high degree of greenness and moisture content of the logs, and frequently for massive logs, too, inasmuch the latter easily augments the contact pressure imposed on the log surfaces to exceed the limit pressure required for dislodging the bark.

It is generally known that short, massive logs give a high average log bunch density even in a tumbling bunch of logs. In contrast, long and slender logs may give a bunch density reaching only 20% of the values achievable by the first kind of log. Resultingly, it is obvious that the debarking process cannot be controlled based on the top level of the log bunch or the weight of logs in the debarking drum. Superficial field experience of these facts has generally forced to adapt a so-called "running by a formula" convention, whereby the operator of the debarking process has given set values for the drum operation according to the assessed running situation. This approach is exemplified in, e.g., patent publication WO 9117030 according to which the operator enters log parameter information to a drum debarking process control based on weighing data. Herein, a problem arises therefrom that the operator does not have exact information on the current wood species and log type, both parameters typically tending to change very rapidly.

Logs to be debarked have the following parameters that can substantially modify their debarking behavior:

a) Length of log to be debarked, whereby this parameter affects the density of the log bunch tumbling in the drum according to formula $(L/l)^{(1/2)}$ so that-short logs (l) give a higher average density of log bunch.

b) The diameter of the log being debarked, whereby the average density of the log bunch tumbling in the drum is affected according to formula $(D/d)^{(1/3)}$ so that massive logs (D) give a higher average density of the log bunch.

c) The greenness or solids content of logs that may affect the specific density of the logs by ±20%.

In consideration to the above variations in the average density of the log bunch within the limits of conventional log material to be debarked, it is easy to understand that the drum filling degree can vary widely even when the overall weight of the drum contents is kept constant. It is obvious from the foregoing that a proper retention time based drum control is not achievable solely on the information of the height or weight of the log bunch in the drum. Measurement techniques based only on the height or weight of the log bunch in the drum are disclosed in Finnish patent applications 991530 and 923944.

The method according to the invention now offers a novel technique for controlling the debarking process discussed above in an improved manner utilizing information obtained from drum weighing. The characterizing features of the method are disclosed in appended claim 1.

By virtue of controlling the debarking process using the drum rotating torque information delivered by the drum operating system in combination with the drum weighing information, the control system can compute information on the average density and top level of the log bunch tumbling in the drum. Then, based on this information, it is possible to control the actual mass of logs in the drum. The moisture content, as well as the length and diameter variations of logs can be assessed on the basis of the specific weight of the wood material. This makes it possible to identify required changes in the retention time and perform suitable compensating actions with the help of, e.g., a variable drum rotation speed control that has recently been widely adopted in the industry. Then, it is appropriate to replace the concept of debarking retention time with the concept of debarking work which is proportional to the number of tumbling turns of the log bunch in the drum.

Next, the invention will be examined in greater detail by making reference to the attached drawings wherein FIG. 1 shows a drum debarker in a side view;

Figure 1:
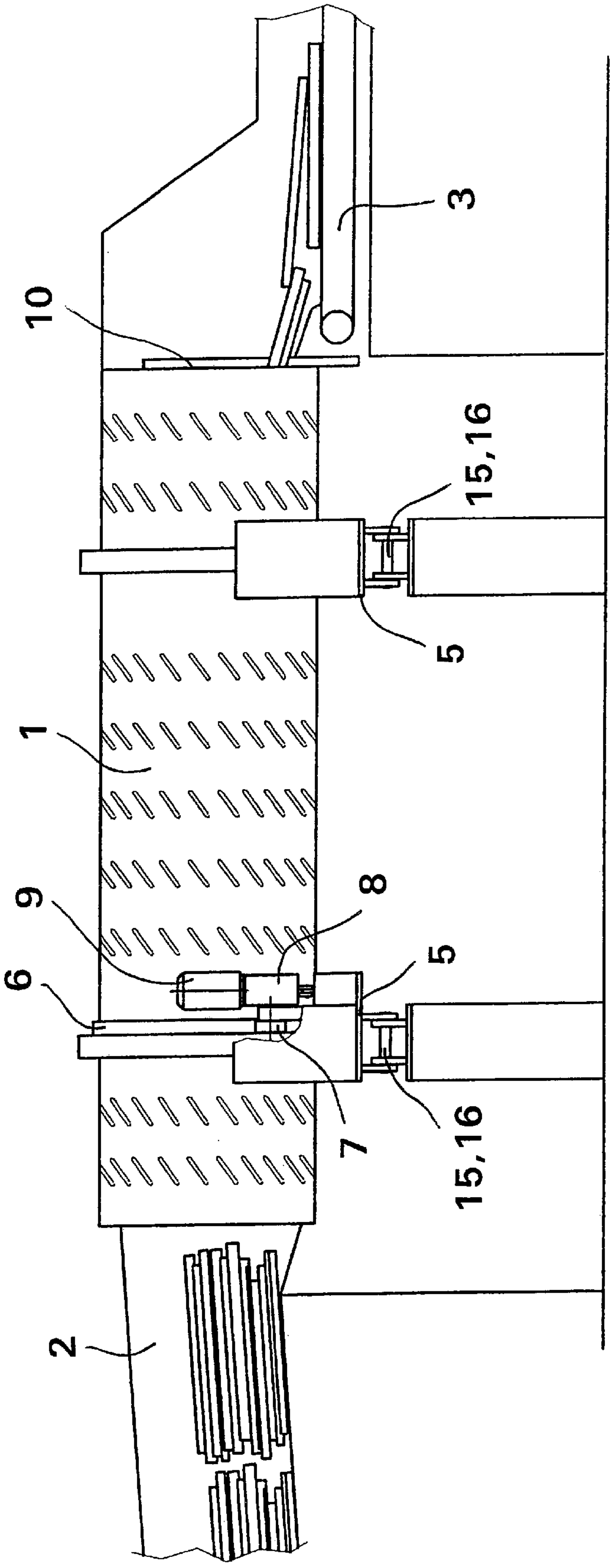

In FIG. 1 is illustrated a debarking drum 1 with its infeed conveyor 2 and discharging conveyor 3. Logs 4 fed into the drum 1 move forward therein as the drum is rotated by means of drive machinery adapted on support structures 5. The drive machinery for debarking drum 1 shown in FIG. 1 is comprised of a gear rim 6 with a gearwheel 7 for rotating the drum and of a reduction gear 8 with a drive motor 9. Typically, the number of drive machinery is two or more. The drum is generally mounted forward inclined thus aiding the travel of logs through the drum. At the outlet end of the drum is provided a discharge gate 10 whose position is actuator-driven in order to control the amount of logs in drum 1. The quantity of logs in the drum affects the retention time of logs in the drum and thereby their debarking time.

With the log material normally debarked, the average density of the log bunch fed into the drum varies widely and, hence, also the drum filling degree can change drastically. Considering for instance a change in the log length from L=5 m to l=2 m and in diameter from D=0.25 m to d=0.10 m while the moisture content simultaneously changes by 30%, the change in the average density of the log bunch in the drum computes as:

$$\rho_1=\{(5/2)^{(1/2)}(0.25/0.10)^{(1/3)}1.3\}\rho_2$$

$$\rho_1\approx 2.8\rho_2.$$

Accordingly, the drum filling degree may vary within 40% and 100% while the drum weighing system detects no change in the overall weight of the log bunch in the drum. Hence, it is obvious that information obtained on the drum weight or filling degree alone is not sufficient to determine a proper debarking time.

Figure 2:
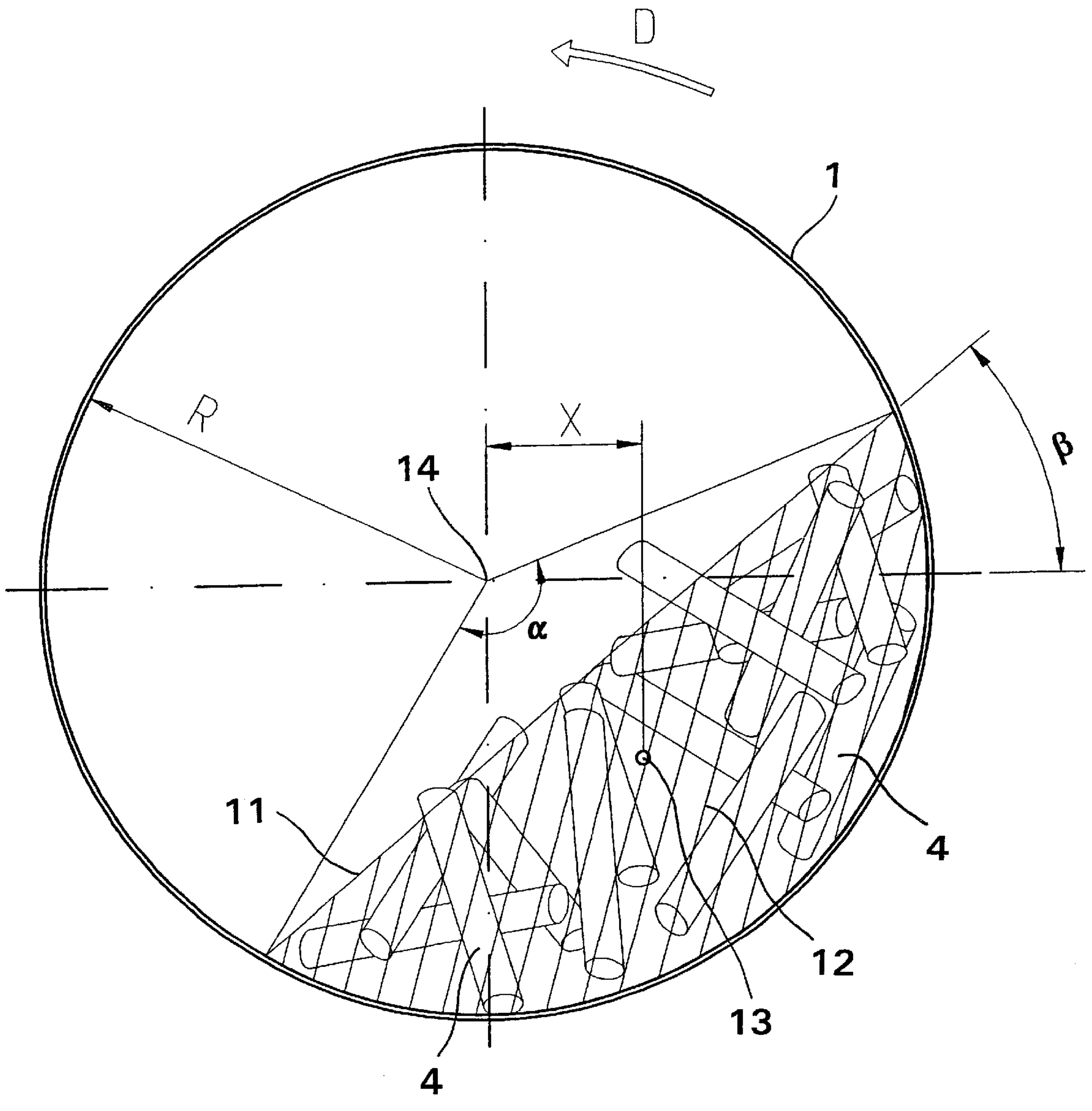
FIG. 2 shows a cross-sectional view of the drum of the debarker.

In FIG. 2 is shown a cross-sectional view of a drum with radius R, wherein logs under the effect of its direction of rotation (direction D) and gravitation tend to settle on the inner periphery of the drum so that the top level 11 of the log bunch deviates from horizontal by a tumbling angle β. The cross section of the log bunch that forms a segment 12 in the circular cross section has a center of gravity 13. Then, the torque required for rotating the drum can be computed from the currents of the electric drive motors. Alternatively, the rotating torque of the drum can be measured from the reduction gear support structure of the drive machinery in the manner shown in FIG. 3. Knowing the torque M required for rotating the drum and the weight Q of the log bunch in the drum, the length X of the torsional moment arm of the segment center of gravitation 13 can be computed in a conventional manner as:

$$M=QX$$

Respectively, for a known tumbling inclination angle β of the log bunch segment, the horizontal distance X of the center of gravity from the drum shell center point 14 can be computed by conventional trigonometry as a function of angle α representing the angle spanned by the tumbling segment:

$$X/\sin\beta=(4R\sin^3(\alpha/2))/(3(\alpha-\sin\alpha))$$

Finally, the drum filling degree can be computed from the value of angle α. Furthermore, the average density of the log bunch can be computed from the weighing information and the drum filling degree. The average density of the log bunch may be processed further to obtain information on the lengths, degree of massiveness or moisture content of the logs.

The drum weight can be measured by means of, e.g., strain-gage sensors mounted on the support structures 5 so adapted as to measure stress changes on the structures or with the help of sensors 15 measuring the shear stresses imposed on the shafts. In a drum mounted rotating on rubber rollers, it is also possible to sense the change in the vertical position of the drum shell as a function of the drum weight with varying amount of wood in the drum. This kind of system is known in the art from patent application FI 923944. An essential factor in the implementation of the invention is to achieve a good accuracy in both the drum weight measurement and drive torque sensing.

In conjunction with the measurements, the system must be configured so that the dead weight of the empty drum and the drive torque thereof can be subtracted sufficiently accurately in the computations. Moreover, it must be borne in mind that the direction and magnitude of the drive torque rotating the drum affects the sensed weight of the debarking drum. Drive forces incurred in the operation of a debarking drum are discussed, e.g., in patent application FI 942515. According to practical tests, shaft transducers measuring shear stress are capable of rendering a very accurate measurement result.

Figure 3:
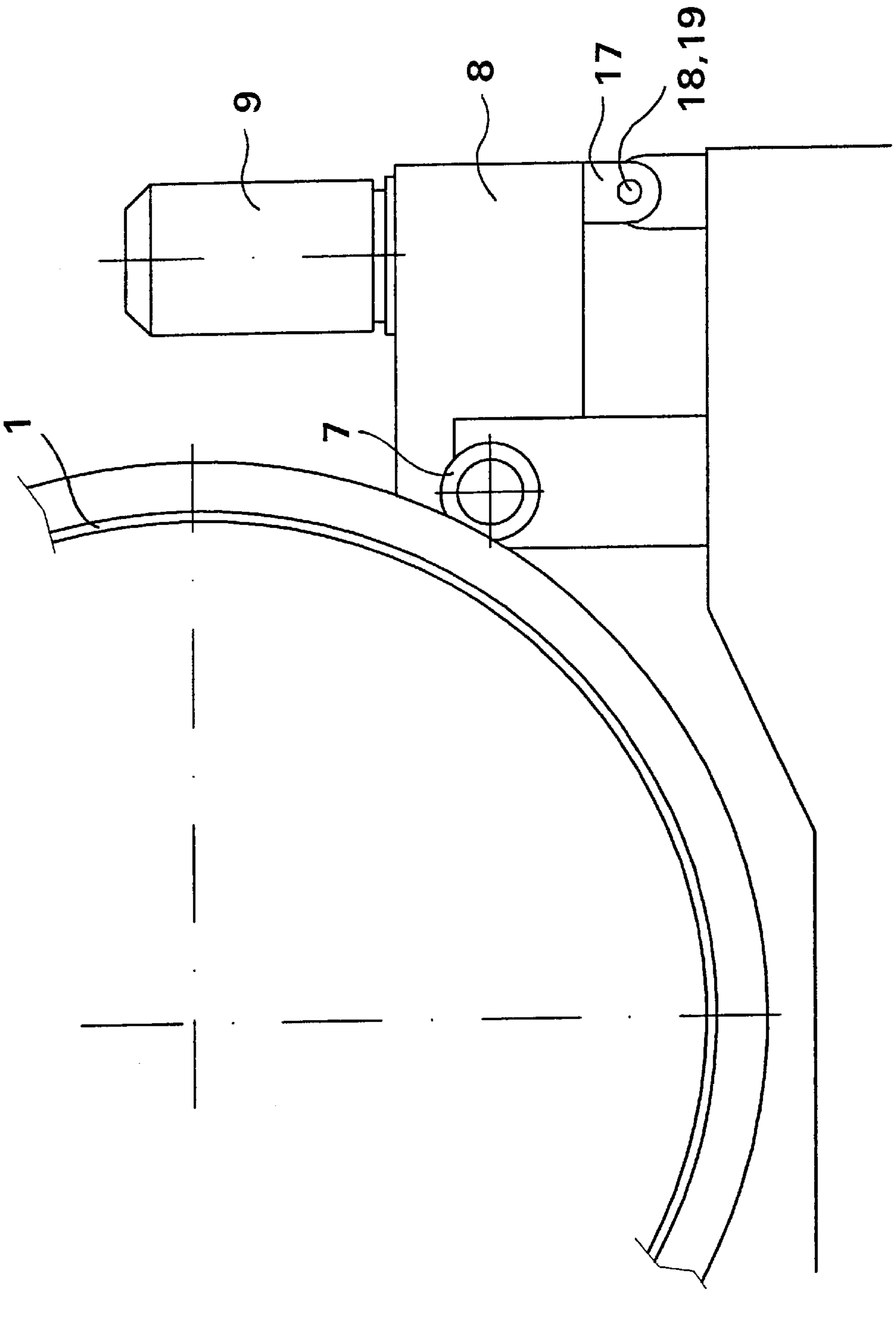
FIG. 3 shows the rotation drive machinery of the debarking drum.

FIG. 1 shows a debarking drum 1 supported on four shafts 16. Each one of the shafts incorporate a sensor 15 capable of sensing changes in the shear stress imposed on the shaft at different weights of the drum. The shaft support structures with sensors 15 are adapted two by two in parallel at opposite ends of the drum. By combining the measurement results of both ends, the overall weight of the drum 1 and of the logs residing therein, as well as changes in these values, can be computed. While a single measurement point alone could be used, the system accuracy is severely compromised. The system shown in FIG. 1 also gives information on the amount of logs at either end of the drum, i.e., on the distribution of logs in the drum. This information is valuable in the control of the drum debarker. Furthermore, the torque support 17 of the debarking drum reduction gear(s) 8 may be equipped with a shear-stress transducer 19 of the shaft-transducer type 18 as shown in FIG. 3. This arrangement makes it possible to eliminate electrical measurement errors that can impair the control function.

Alternatively, the drum control information can be derived by combining the weighing information with drum filling degree data obtained directly by way of, e.g., an optical method or the like. An implementation of optical sensing of drum filling degree is described in patent application FI 991530.

The drum weighing and filling degree information makes it possible to determine the average density of the log bunch residing in the drum, whereupon the density information serves as a variable in the computation of target values for the retention time or debarking work of the log bunch in the drum so that a desired outcome of debarking results.

A desired retention time or debarking work can be achieved by controlling, either separately or jointly these factors: drum rotation speed, log discharge rate and log infeed rate.

Figure 4:
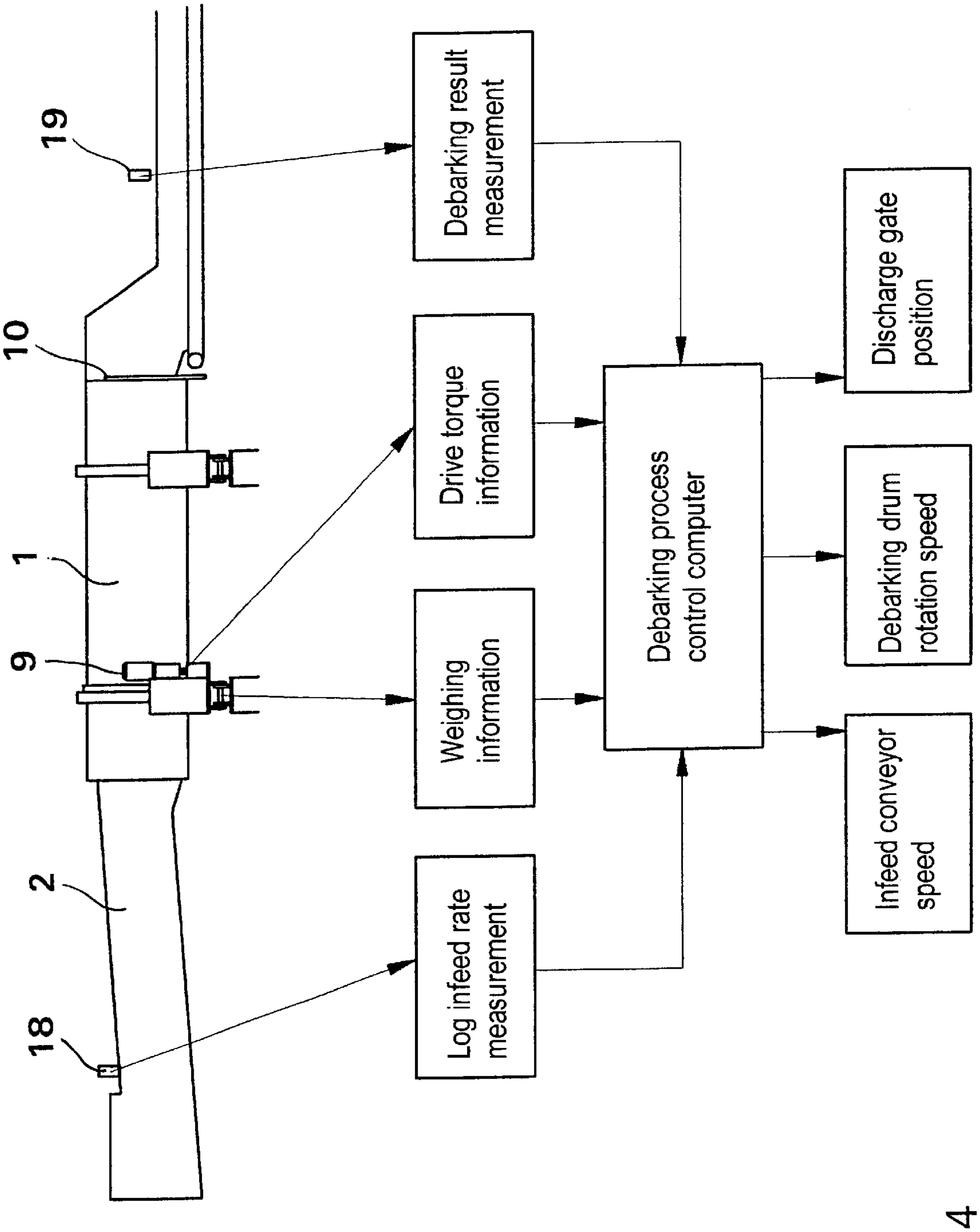
FIG. 4 shows a control diagram of the debarking process.

In FIG. 4 is shown a system in accordance with the invention and the method disclosed therein that implements the control of a drum debarker. Therein, a control computer 20 obtains weight information from the drum support structures. The same control computer also receives drive torque information from the torsional support structures of the drive reduction gears. The control computer processes the information and based on derived data, i.e., the average density and filling degree of the log bunch in the drum, controls the infeed conveyor 2, the speed of drum drive motors 9 and the position of discharge gate 10. In certain applications, the control computer may also receive information from a sensor of the infeed conveyor 18 that detects the filling degree of the conveyor.

Postmonitoring of the debarked logs by a sensor 19 gives feedback from the outcome of debarking. Thus, the present invention offers a method with sufficient tools or measurement techniques to implement a new generation of debarking process control. The control program must be developed based on sufficient data from tests so that an optimal debarking efficiency can be obtained under all possible operating conditions.

The method according to the invention provides substantial benefits when combined with a so-called “self-learning” control system. A significant advantage over conventional techniques is that the control system can compute the average density and top level of the log bunch tumbling in the drum.

The method disclosed herein is also very convenient in the control of a two- or multi-section drum debarker. When having the weighing and drive torque or drum filling degree information taken from two successive drum sections, obviously the average density of the log bunch can be computed at a higher accuracy, whereby also the debarking process control can be carried out in a more precise manner.

What is claimed is:

1. A method for controlling a drum debarker by using drum weighing information in the control of the drum debarking process, the method comprising the steps of;

determining the weight of the contents in the debarking drum, determining the filling degree of the debarking drum, determining the average density of a log bunch tumbling in the debarking drum from said drum weighing information and said drum filling degree information, determining a target value for the log retention time in the debarking drum, and controlling at least one of the following variables: drum rotating speed, discharge rate of logs from the drum and infeed rate of logs into the drum so as to achieve said target value for the log retention time in the debarking drum.

2. The method of claim 1, wherein the drum filling degree is determined based on the drum weighing and drive torque information.

3. The method of claim 2, wherein the drive torque information is determined from a shear stress measurement performed at the support structures of the drum drive reduction gear.

4. The method of claim 2, wherein the drive torque information is determined from the drive motor current.

5. The method of claim 1, wherein the drum filling degree is determined based on a height measurement sensing the top level of the log bunch tumbling in the debarking drum.

6. The method of claim 1, wherein the drum weighing information is obtained from both ends of the debarking drum.

7. The method of claim 2, wherein the drum weighing information is obtained from both ends of the debarking drum.

8. The method of claim 3, wherein the drum weighing information is obtained from both ends of the debarking drum.

9. The method of claim 4, wherein the drum weighing information is obtained from both ends of the debarking drum.

10. The method of claim 5, wherein the drum weighing information is obtained from both ends of the debarking drum.

11. A method for controlling a drum debarker by using drum weighing information in the control of the drum debarking process, said method comprising the steps of:

determining the weight of the contents in the debarking drum, determining the filling degree of the debarking drum, determining the average density of a log bunch tumbling in the debarking drum from said drum weighing information and said drum filling degree information, determining a target value for the amount of debarking performed in the debarking drum, and controlling at least one of the following variables: drum rotating speed, discharge rate of logs from the drum and infeed rate of logs into the drum so as to achieve said target value for the amount of debarking performed in the debarking drum.

12. The method of claim 11, wherein the drum filling degree is determined based on the drum weighing and drive torque information.

13. The method of claim 12, wherein the drive torque information is determined from a shear stress measurement performed at the support structures of the drum drive reduction gear.

14. The method of claim 12, wherein the drive torque information is determined from the drive motor current.

15. The method of claim 11, wherein the drum filling degree is determined based on a height measurement sensing the top level of the log bunch tumbling in the debarking drum.

16. The method of claim 11, wherein the drum weighing information is obtained from both ends of the debarking drum.

17. The method of claim 12, wherein the drum weighing information is obtained from both ends of the debarking drum.

18. The method of claim 13, wherein the drum weighing information is obtained from both ends of the debarking drum.

19. The method of claim 14, wherein the drum weighing information is obtained from both ends of the debarking drum.

20. The method of claim 15, wherein the drum weighing information is obtained from both ends of the debarking drum.

* * * * *